United States Patent [19]

Swech

[11] 4,131,292
[45] Dec. 26, 1978

[54] FRONT SKI ATTACHMENT FOR MOTOR BIKE

[76] Inventor: Melvin J. Swech, 1414 Garfield Ave., Brunswick, Ohio 44214

[21] Appl. No.: 776,124

[22] Filed: Mar. 10, 1977

[51] Int. Cl.² .......................................... B62M 27/02
[52] U.S. Cl. .................................... 280/14; 180/5 R
[58] Field of Search ............... 280/8, 14, 26, 16, 21 R; 180/6 A, 5 R

[56] References Cited

U.S. PATENT DOCUMENTS

| | | | |
|---|---|---|---|
| 3,504,752 | 4/1970 | Milward | 280/16 X |
| 3,507,346 | 4/1970 | Hauser | 280/21 R X |
| 3,783,959 | 1/1974 | Krume | 180/6 A |
| 3,814,198 | 6/1974 | Seiler | 180/6 A |

FOREIGN PATENT DOCUMENTS 249662 7/1912 Fed. Rep. of Germany ........ 280/21 R

Primary Examiner—Joseph F. Peters, Jr.
Assistant Examiner—Norman L. Stack
Attorney, Agent, or Firm—Oldham, Oldham, Hudak & Weber Co.

[57] ABSTRACT

A ski attachment for a motor bike or the like for use to replace a front wheel of a vehicle having a pair of parallel front support arms that normally operatively position a wheel at the their lower ends. The attachment includes a support sleeve adapted to be positioned and supported by the support arms at their lower ends, a pair of skis, and reenforcing members secured to and extending between the support sleeve and skis to form a unit therefrom.

2 Claims, 9 Drawing Figures

U.S. Patent   Dec. 26, 1978   Sheet 2 of 2   4,131,292
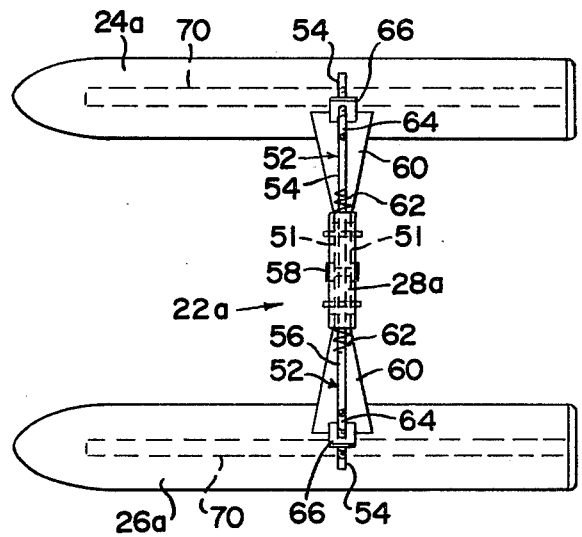
FIG. 6
FIG. 8
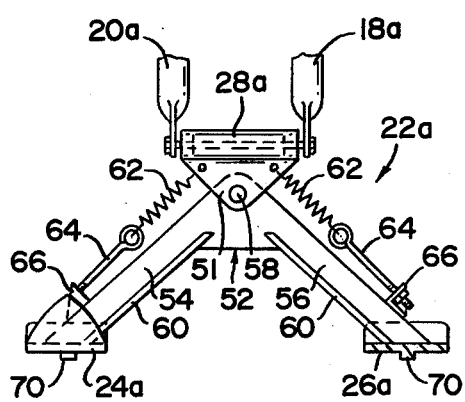
FIG. 7
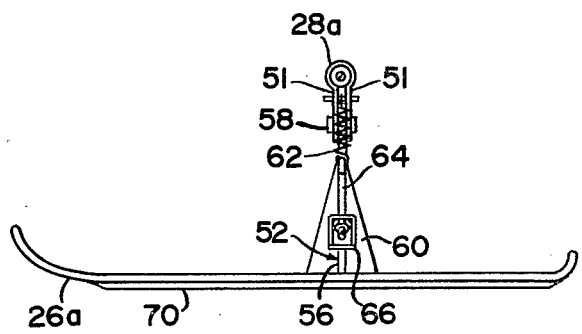
FIG. 9

FRONT SKI ATTACHMENT FOR MOTOR BIKE

BACKGROUND OF THE INVENTION

Heretofore there have been many different types of snowmobiles provided wherein the vehicle is a permanent structure adapted to move over snow or ice or equivalent surfaces. Also, efforts have been made heretofore to provide removable ski attachments for various vehicles and structures of foregoing types are illustrated in U.S. Pat. Nos. 3,077,238; 3,756,615; and 2,085,295.

Inasmuch as there are many, many motor bikes in use at this time, it would be highly desirable to provide an attachment means for use with the motor bike to replace the front wheel thereof with a ski attachment to make such bike usable over snow and ice conditions. Insofar as I am aware, no one currently has provided a sturdy, practical ski attachment for use with motor bikes.

It is the general object of the present invention to provide a novel and improved ski attachment adapted to be mounted on the front axle of a motor bike and to position a pair of skis in operative relationship on the motor bike.

Another object of the invention is to provide a sturdy ski unit that will conveniently fit onto a motor bike with a minimum of adjustment of the same and to provide a steering action for the motor bike.

Yet another object of the invention is to provide a ski means that can be attached to a motor bike by a sturdy metal assembly that will position the skis operatively on the motor bike and provide for load carrying action on the skis.

The foregoing and other objects and advantages of the invention will be made more apparent as the specification proceeds.

In the accompanying drawings:

FIG. 6 is a plan view of a modified embodiment of the invention;

FIG. 7 is a side elevation of the structure of FIG. 6;

FIG. 8 is a front elevation of the unit of FIG. 6 when operatively positioned; and FIG. 9 is a fragmentary enlarged detail of the tension adjusting means of FIG. 6.

When referring to corresponding members shown in the drawings and described in the specification, corresponding numerals are used to facilitate comparison therebetween.

SUBJECT MATTER OF INVENTION

Figure 1:
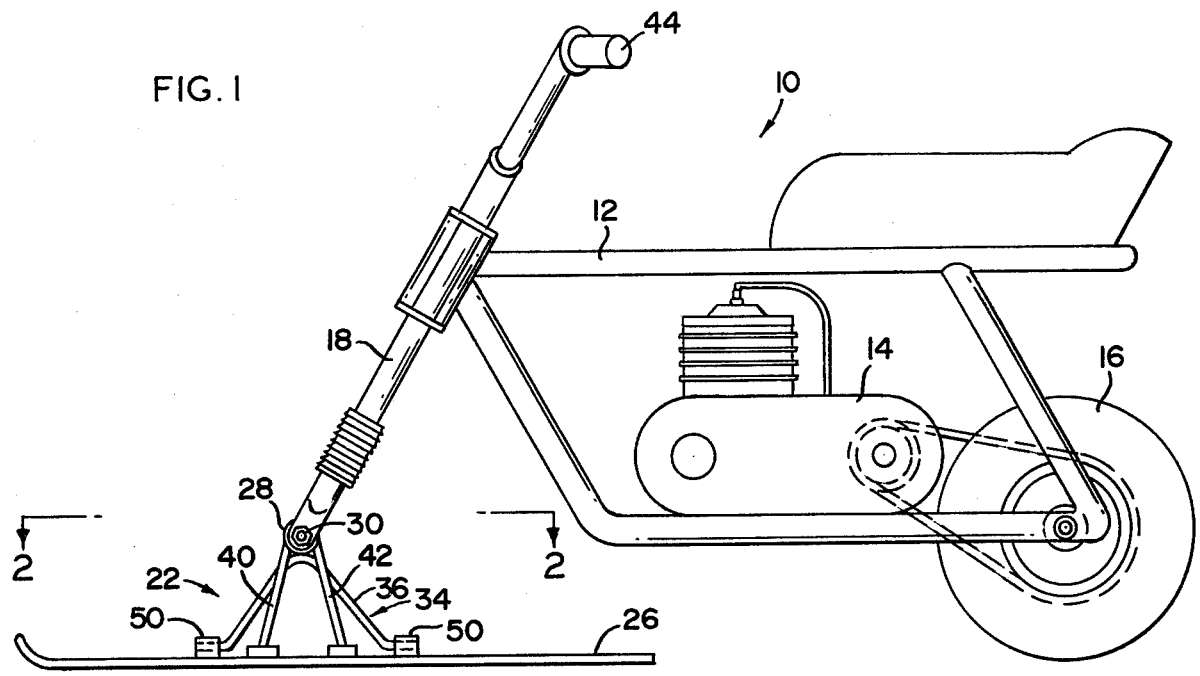
FIG. 1 is a side elevation of a motor bike having the ski attachment of the invention operatively secured thereto.

The present invention, as one embodiment thereof, relates to a ski attachment for use with a motor bike or similar vehicle to replace the front wheel thereof, and wherein the attachment unit comprises a support sleeve or hub adapted to be positioned by the support arms of the motor bike and be operatively engaged therewith by a front axle unit or the like; a pair of skis, and reenforcing means secured to and extending between the support sleeve and the skis to form a unit therefrom to support the front end of the motor bike thereon.

With reference to the details of the construction shown in the accompanying drawings, a motor bike is indicated as a whole by the numeral 10. This bike 10 includes a frame means 12, a drive motor 14, and a rear wheel assembly 16. A pair of parallel downwardly extending front support arms 18 and 20 are shown in the drawing and they form a portion of the frame 12 which arms, normally, position a front wheel (not shown) on the bike. However, by the present invention, a ski attachment unit indicated as a whole by the numeral 22 is provided and is operatively positioned at the lower end of the front arms 18 and 20.

This ski unit 22 of the invention comprises a pair of skis 24 and 26 that are operatively positioned by means of a hub or support sleeve 28. Normally, this support sleeeve extends between the lower ends of the front arms 18 and 20 and is secured therebetween as by an axle or bolt member 30 which may be the conventional front axle of the motor bike. In all events, the bolt means or axle 30 extends through the support sleeve 28 and normally would journal the support sleeve thereon as by means of bearings 32 or the like, whereby the sleeve is free to move in an arc in relation to the front arms 18 and 20 and the bolt or axle means 30.

A complete operative unit is formed from the skis and support sleeve by reenforcing or brace means 34 that extend between and are secured to the skis and the support sleeve to provide unitary attachment and support device therefrom. Preferably, the brace means comprises a pair of reenforcing rods or bars 36, 38, one of which is provided adjacent each side portion of the ski unit 22. Each of these rods is of generally U-shape and its base portion is suitably secured, normally welded. to a peripheral portion of the support sleeve as indicated at 37, and with end portions of each of the rods 36 and 38 being operatively engaged with longitudinally spaced portions of one of the skis 24 or 26, as shown in the drawings.

The unit is further reenforced by another reenforcing member or means, in this instance a pair of substantially U-shaped bars or brace rods 40 and 42. Each of these brace rods extends between the different skis of the pair of skis and has a base or foot portion of such brace rod suitably secured to the individual skis and then, with a base portion of the U-shaped member being, for example, welded to a peripheral portion of the support sleeve 28 as indicated at 41 and/or 43, so that the brace rods or brace means 36, 38, 40 and 42 provide a well secured and braced connecting means for attaching the support sleeve to the skis. Since only peripheral portions of the support sleeve are attached to the brace rods, and with the brace rods extending downwardly or laterally outwardly of the support sleeve, there is no interference between the support sleeve and front arms 18 and 20 of the motor bike so that conventional arcuate steering movements of the ski unit is obtained on the vehicle. Naturally, the front arms 18 and 20 of the vehicle are used for steering purposes, as by a handle 44, and this conventional steering action can be still obtained when the ski unit is attached to the motor bike.

The lower ends of these brace rods can be fixedly attached to the individual skis 24 and 26, as indicated in the drawings, so that a fixed relationship exists therebetween. However, in some instances, it may be desirable to have the skis be able to pivot on their longitudinal axis in arcuate directions. Hence, the lower ends of all of the brace rods may engage with means such as individual blocks 50. Naturally, these brace receiving blocks 50 are in longitudinal alignment with each other along the ski and the ski, hence, is free to be moved arcuately on its longitudinal axis.

Figure 2:
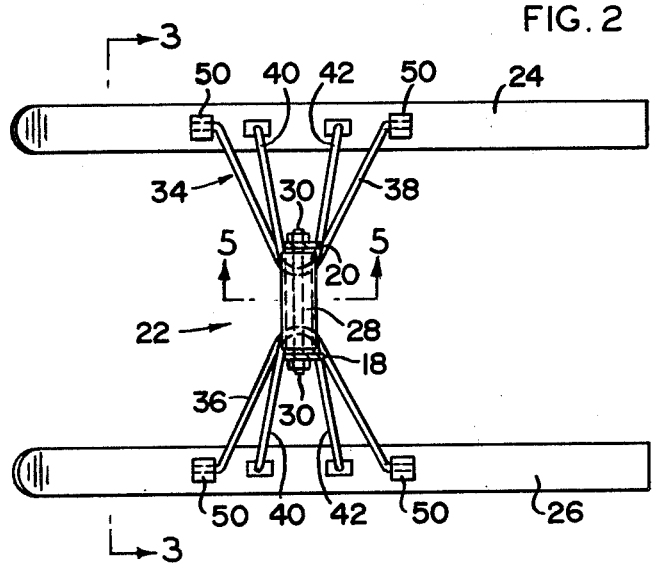
FIG. 2 is a horizontal sectional view taken on line 2—2 of FIG. 1.
Figure 4:
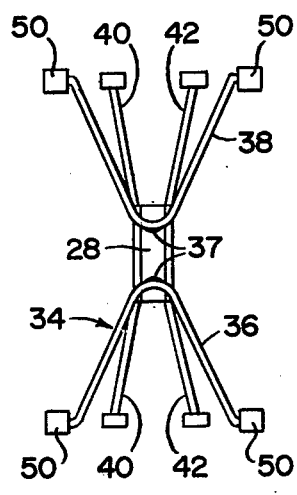
FIG. 4 is a horizontal sectional view taken in the direction of and on line 4—4 of FIG. 3.
Figure 3:
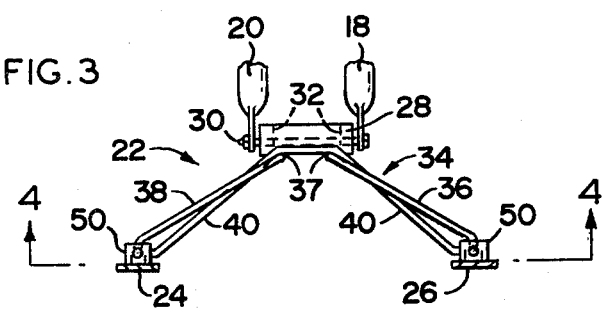
FIG. 3 is a vertical cross sectional view taken on line 3—3 of FIG. 3.
Figure 5:
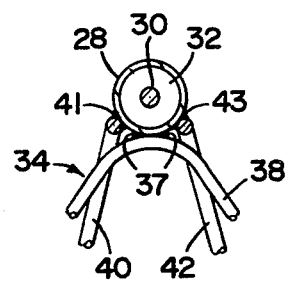
FIG. 5 is a vertical section taken on line 5—5 of FIG. 2.

With reference to the modified ski attachment device or unit 22a of the invention, it is adapted to be mounted in the same manner as the structures of FIGS. 1 through 5 and this unit includes a support sleeve or hub 28a that is operatively positioned between the arms 18a and 20a as in the other embodiment of the invention. However, in the present instance, the unit 22a of the invention can be moved in a plane extending laterally of and substantially perpendicular to the longitudinal axis of the motor bike 10.

This particular unit includes a pair of skis 24a and 26a, and the support sleeve 28a has a flange plate or two plates 51, as shown, secured thereto and depending therefrom. These plates 51 pivotally engage an A-shaped support 52 that has one leg 54 engaging the ski 24a and a second leg 56 has its lower end extending to and operatively engaging the second ski 26a. A pin or bolt 58 pivotally secures the upper end of this A-shaped support 52 to a lower end of the flange plate or plates 51. Usually the A-frame 52 has reenforcing plates 60 secured to a lower surface thereof and protruding forwardly and backwardly therefrom for reenforcing the same.

In order to make the positioning of the ski attachment adjustable, but yet to permit the desired pivotal movement thereof in relation to the bike, a pair of adjustable tension assemblies including coil springs 62 engage the individual legs of the support 52. These springs 62 extend between the flange plate 51 and a suitable eye-bolt 64 or the like, which bolt is in threaded or other engagement with a bracket plate 66 secured to and protruding upwardly from one of the support legs 54 and 56. These eye-bolts 64 can be adjusted after it has been released from the coil spring 62 to vary the initial tension setting of the coil springs and aid in determining the no load positioning of the ski attachment means as well as the freedom of lateral movement of the attachment unit.

The skis 24a and 26a preferably have longitudinally extending center ribs 70 on the lower edge thereof to aid the skis in being in good engagement with the snow or other support surface to facilitate steering action.

The units of the invention are of sturdy construction, they can be readily manufactured from conventional materials, and they will be readily positionable on a motor bike or the like by use of a conventional front axle or equivalent mounting means provided on the motor bike. Hence, the motor bike has been made versatile and it has been made completely controllable for driving over snow and ice conditions. Thus, it is believed that the objects of the invention have been achieved.

While two complete embodiments of the invention have been disclosed herein, it will be appreciated that modification of these particular embodiments of the invention may be resorted to without departing from the scope of the invention.

What is claimed is:

1. A ski attachment for a motor bike or the like for use to replace a front wheel of the vehicle, which vehicle has a pair of parallel front support arms adapted to operatively position a wheel and its support sleeve at the lower end of said support arms, said attachment comprising a pivotably mounted support sleeve adapted to be positioned by and extend between the support arms replacing a wheel and its support sleeve, a pair of skis, and a reenforcing means secured to and extending between said support sleeve and said skis to form a unit therefrom, said support sleeve having a dependent flange thereon and said reenforcing means comprising an A-shaped metal frame fixedly secured at its base portions to said skis and secured to said support sleeve at said dependent flange; and adjustable tension means connecting said skis to opposed edge portions of said flange, and said ski unit can pivot laterally of the bike.

2. A ski attachment for a motor bike that includes a frame, a front axle, and steering means operably connected to the front axle and mounting it on the motor bike, said ski attachment comprising a sleeve for engaging the front axis, a dependent flange on said sleeve, a pair of skis, brace means pivotally secured to said dependent flange on said sleeve and having legs individually engaging said skis to form a unit therewith, said unit being pivotal laterally of the axle, and tension members extending between each of said legs and said flange to vary pivotal movement of said unit and to provide a sturdy unit mountable on the motor bike in place of the front wheel of the bike;

said sleeve being adapted to engage a front axle for movement of the said unit in a plane extending longitudinally of the bike; said unit being pivotal about said flange in a plane extending transversely of the bike; said tension members including two separate adjustable spring units each individually extending operatively between a respective leg and flange.

* * * * *